(12) United States Patent
Feulner et al.

(10) Patent No.: US 10,922,913 B2
(45) Date of Patent: Feb. 16, 2021

(54) METHOD AND APPARATUS FOR DETECTING A SECURITY THREAD IN A VALUE DOCUMENT

(71) Applicant: GIESECKE+DEVRIENT CURRENCY TECHNOLOGY GMBH, Munich (DE)

(72) Inventors: Johannes Feulner, Munich (DE); Steffen Schmalz, Munich (DE)

(73) Assignee: GIESECKE+DEVRIENT CURRENCY TECHNOLOGY GMBH, Munich (DE)

(*) Notice: Subject to any disclaimer, the term of this patent is extended or adjusted under 35 U.S.C. 154(b) by 0 days.

(21) Appl. No.: 16/473,825

(22) PCT Filed: Dec. 22, 2017

(86) PCT No.: PCT/EP2017/001446
§ 371 (c)(1),
(2) Date: Jun. 26, 2019

(87) PCT Pub. No.: WO2018/121883
PCT Pub. Date: Jul. 5, 2018

(65) Prior Publication Data
US 2019/0340861 A1 Nov. 7, 2019

(30) Foreign Application Priority Data
Dec. 27, 2016 (DE) .................... 10 2016 015 545.0

(51) Int. Cl.
*G07D 7/04* (2016.01)
*B42D 25/29* (2014.01)
(Continued)

(52) U.S. Cl.
CPC ............... *G07D 7/04* (2013.01); *B42D 25/29* (2014.10); *G06K 7/087* (2013.01);
(Continued)

(58) Field of Classification Search
None
See application file for complete search history.

(56) References Cited

U.S. PATENT DOCUMENTS

| 5,255,129 | A | 10/1993 | Jones |
| 6,229,306 | B1 | 5/2001 | Stein et al. |

(Continued)

FOREIGN PATENT DOCUMENTS

| DE | 69019752 T2 | 12/1995 |
| DE | 19625224 A1 | 1/1998 |

(Continued)

OTHER PUBLICATIONS

German Search Report from DE Application No. 102016015545.0, dated Dec. 27, 2016.

(Continued)

*Primary Examiner* — Kristy A Haupt
(74) *Attorney, Agent, or Firm* — Workman Nydegger

(57) ABSTRACT

A method is described for detecting a security thread in a value document, in which magnetic data are employed for sites on the value document, said magnetic data representing a magnetic property of the value document at the site, check sites on the value document are determined employing the sites, and from the check sites, a straight line is specified, along or on which at least some of the check sites lie and which represents a location of the security thread.

20 Claims, 4 Drawing Sheets

(51) Int. Cl.
*G06K 7/08* (2006.01)
*G06K 7/10* (2006.01)
*G06K 19/06* (2006.01)
*G07D 7/004* (2016.01)

(52) U.S. Cl.
CPC ... *G06K 7/10792* (2013.01); *G06K 19/06196* (2013.01); *G07D 7/004* (2013.01)

(56) References Cited

U.S. PATENT DOCUMENTS

| | | |
|---|---|---|
| 7,063,257 B2 | 6/2006 | Buttifant et al. |
| 7,434,732 B2 | 10/2008 | Buttifant et al. |
| 7,516,893 B2 | 4/2009 | Buttifant et al. |
| 8,387,879 B2 | 3/2013 | Schutzmann et al. |
| 8,544,630 B2 | 10/2013 | Schutzmann et al. |
| 8,910,869 B2 | 12/2014 | Schutzmann et al. |
| 9,703,994 B2 | 7/2017 | Paul et al. |
| 9,911,074 B2 | 3/2018 | Rahm et al. |
| 10,002,267 B2 | 6/2018 | Schutzmann |
| 2004/0046023 A1 | 3/2004 | Buttifant et al. |
| 2006/0186203 A1 | 8/2006 | Buttifant et al. |
| 2006/0208078 A1 | 9/2006 | Buttifant et al. |
| 2007/0095630 A1* | 5/2007 | Mennie ............... G07F 19/202 194/206 |
| 2011/0233277 A1 | 9/2011 | Schutzmann et al. |
| 2012/0160632 A1 | 6/2012 | Schutzmann et al. |
| 2013/0082105 A1 | 4/2013 | Schutzmann et al. |
| 2014/0367469 A1 | 12/2014 | Schutzmann |
| 2016/0042265 A1 | 2/2016 | Rahm et al. |
| 2016/0055358 A1 | 2/2016 | Paul et al. |

FOREIGN PATENT DOCUMENTS

| | | |
|---|---|---|
| DE | 60200091 T2 | 4/2004 |
| DE | 60215768 T2 | 3/2007 |
| DE | 102008061507 A1 | 6/2010 |
| DE | 102009039588 A1 | 3/2011 |
| DE | 102010035469 A1 | 3/2012 |
| DE | 102011120972 A1 | 6/2013 |
| DE | 102013205891 A1 | 10/2014 |
| EP | 0276814 A2 | 8/1988 |
| EP | 1221679 B1 | 11/2003 |
| EP | 1589494 A1 | 10/2005 |
| EP | 1353301 B1 | 11/2006 |
| GB | 2098768 A | 11/1982 |
| WO | 2011154088 A1 | 12/2011 |
| WO | 2014161674 A1 | 10/2014 |

OTHER PUBLICATIONS

International Search Report from Application No. PCT/EP2017/001446, dated Mar. 21, 2018.

International Preliminary Report on Patentability from PCT Application No. PCT/EP2017/001446, dated Jul. 2, 2019.

* cited by examiner

METHOD AND APPARATUS FOR DETECTING A SECURITY THREAD IN A VALUE DOCUMENT

BACKGROUND

The present invention relates to a method for detecting a security thread in a value document and means for carrying out the method.

Value documents are understood as sheet-shaped objects, which represent, for example, a monetary value or an authorization and which should therefore not be manufacturable at will by unauthorized persons. They hence have features, so-called security features, that are not easy to manufacture, in particular to copy, whose presence is an indication of authenticity, i.e. manufacture by an authorized body. Some important examples of such value documents are chip cards, coupons, vouchers, checks and in particular banknotes.

Certain types of value documents frequently contain as a security feature a security thread that is at least partially embedded in the substrate of the value document. Since the security threads are frequently embedded in the substrate of value documents, value documents with security threads are thicker in the sections with the security threads, which could result in skewed stacks when stacked. The location of security threads in value documents, also of the same type, is therefore not precisely determined, but can vary within predetermined limits.

In many cases, the security threads have one or several magnetizable regions that can be magnetized by means of an external magnetic field. In the following, a security thread is understood as a security thread which can be magnetized as a whole or has one or several magnetizable regions. Such security threads or regions of security threads are detectable by means of suitable magnetic sensors. Examples of such sensors are described, for example, in DE 196 25 224 A1, DE 10 2008 061 507 A1, DE 10 2009 039 588 A1, DE 10 2010 035 469 A1, DE 10 2011 120 972 A1 and WO 2011/154088 A1. To increase security, the security threads can have a magnetic coding. The magnetic coding can be formed by sections of the security thread that have different magnetic properties in accordance with a predetermined pattern or code. The sections can differ in particular with respect to their magnetizability; for example, the sections can be magnetically soft or hard. Magnetically hard sections can additionally differ in their coercive field strength. A closer examination of such security threads with coding is greatly facilitated when the location of the security thread is known.

Magnetic sensors are employed for checking by machine. For detecting a security thread, i.e. at least its presence and/or its location, the measuring signals of a respective magnetic sensor have to be evaluated. However, this is complicated by the circumstance that the measuring signals can be subject to noise. Further, in the substrate of a value document small portions of magnetizable materials can be present, which have inadvertently entered the substrate material. Also, a print with a magnetizable printing ink can make recognition of the security thread more complicated.

SUMMARY

It is therefore the object of the present invention to state a method for detecting a security thread in a value document, which operates in robust and simple manner. It is a further object of the present invention to state means for carrying out the method.

The object is achieved by a method for detecting a security thread in a value document, in which magnetic data for sites on the value document are employed that represent a magnetic property of the value document at the site, check sites on the value document are determined employing these sites, and from the check sites a straight line is ascertained along which or on which at least some of the check sites lie and which represents a location of the security thread. Use is made here of the circumstance that security threads extend in a straight line in a value document. Preferably, the straight line is specified such that as many of the check sites as possible lie along or on the straight line.

It is preferred that, for specifying the straight line, a set of cells is supplied which represent a division of at least one predetermined part of a parameter space for straight line parameters into cells, cells of the set are ascertained respectively for the check sites, within which cells respectively straight line parameters of a straight line lie that extends through the respective check site, and a cell sum for the respective cell is increased by an increment value, and the cell with the highest cell sum is searched and a straight line given by straight line parameters allocated to the cell is ascertained as the location of the security thread.

The object is further achieved by a method according to claim 2 and in particular a method for detecting a security thread in a value document, wherein magnetic data for sites on the value document are employed that represent a magnetic property of the value document at the site, check sites on the value document are determined employing the sites, a set of cells is supplied which represent a division of at least one predetermined part of a parameter space for straight line parameters into cells, cells of the set are ascertained respectively for the check sites, within which cells respectively straight line parameters of a straight line lie that extends through the respective check site, and a cell sum for the respective cell is increased by an increment value, and the cell with the highest cell sum is searched and a straight line given by straight line parameters allocated to the cell is ascertained as the location of the security thread.

The object is further achieved by an evaluation device for detecting a security thread in a value document which has an interface for capturing signals from which the magnetic data can be ascertained, or for capturing the magnetic data, and is adapted to carry out a method according to the invention.

The object is further achieved by a computer program for execution by means of a data processing device with a processor, which program contains program code upon whose execution a method according to the invention is executed by the processor.

The object is further achieved by a computer-readable data carrier on which a computer program according to the invention is stored.

The evaluation device according to the invention can in particular have a data processing device with at least one processor and a memory in which a computer program according to the invention for execution by the processor is stored.

Unless otherwise indicated by the context, the following general statements apply to both methods.

With the method according to the invention and the means according to the invention for carrying out the method, it is possible to easily determine the location of a security thread in a very robust manner, even if other magnetizable components and/or magnetic print are disposed in the region of the security thread.

In the method, magnetic data for sites on the value document are employed that represent a magnetic property of the value document at the site. As a rule, the magnetic data are captured for a small region of the value document, a measuring spot whose shape and size depend on the spatial resolution of a magnetic sensor employed to capture the magnetic data. The site is then understood as a site given by coordinates which, according to a predetermined rule, results from the shape and location of the measuring spot. For example, the geometric center of the measuring spot could be employed.

The magnetic data represent a magnetic property of the value document at the site. Depending on the type of value document, more precisely of the security thread, the magnetic property can be, for example, the magnetizability or the remanence. For the purposes of the method according to the invention it is sufficient here for a number to be ascertained for a site from signals of a magnetic sensor employed for capture, and to be employed as a magnetic data item which can have any desired units predetermined for the method and can be scaled as desired as predetermined for the method.

In the method, upon their employment, the magnetic data can be read from, for example, a memory in which they are stored and then employed further.

In a preferred variant, magnetic data for sites can be captured by means of a magnetic sensor on the value document, i.e. in spatially resolved manner, and these magnetic data can be employed as magnetic data. In principle, any magnetic sensors come into consideration as magnetic sensors, for example inductive magnetic sensors, magneto-resistive magnetic sensors, GMR sensors or also Hall sensors.

The method does not necessarily employ all the magnetic data captured for a value document. Preferably, check sites are specified which lie only in a subregion of the value document. This subregion, in which the security thread is presumed, can be specified or predetermined in different ways. Thus, in the method, a value document type of the value document can be specified and the subregion can be predetermined in dependence on the particular value document type. In the case of value documents in the form of banknotes, the value document type can be given for example by the currency, the denomination or value and optionally the issue of the banknotes. Particularly preferably, a location of the value document is also ascertained and the subregion is additionally predetermined in dependence on the ascertained location. When the value document is disposed or moves in a plane when the magnetic data are captured, the location of the value document is understood as one of the four possible orientations of the value document in the plane, which, through rotations by 180° about axes through the centroid of the value document, extend parallel or perpendicularly to a longer edge of the value document. When predetermining the subregion, predetermined reference parameters can be employed, in particular for the value document type and possibly the location, which can be stored, for example, in the evaluation device.

However, it is also possible to specify the subregion on the basis of the magnetic data employing at least one predetermined criterion. The criterion can in particular be a criterion that the magnetic data are suitable for the detection of the security thread. Particularly preferably, the criterion can concern the magnetic property and/or the local location or distribution of the check sites and/or local changes, preferably a gradient, of the magnetic property in at least one predetermined direction. For example, the criterion can be that the subregion is a rectangle that extends across the value document and that contains sites whose magnetic data fulfill a predetermined data criterion.

In this manner, the number of measuring values employed subsequently can be significantly reduced and thus the implementation of the method can be accelerated. Moreover, it is possible to rule out measuring values which are unsuitable due to their location on the value document alone, and which would impair reliability and/or accuracy. In this manner, a more reliable and/or robust detection can be made possible. In addition, the method can be carried out faster.

In principle, the captured magnetic data can be employed in the method. However, it is preferred that for determining the check sites, the magnetic data in the predetermined subregion are filtered, thus forming filtered magnetic data, and the filtered magnetic data are employed to determine the check sites. In this manner, for example, sites where the magnetic data are falsified by noise or constitute mere noise can be avoided. Preferably, a filter is employed for filtering which has a smoothing effect and/or responds to gradients of the magnetic data. Smoothing can at least partially suppress fluctuations due to measurement inaccuracies. The filter responding to gradients highlights sites where the magnetic data change strongly, as expected on a security thread. The gradients can preferably be gradients in a direction transverse to the expected direction of a security thread to be detected.

The check sites can now be specified such that the magnetic data for these sites or the filtered magnetic data for these sites fulfill a predetermined criterion, for example a threshold value criterion. As a threshold value criterion, for example, the criterion can be employed that the magnetic data or the filtered magnetic data exceed a predetermined threshold value; this threshold value can be selected such that magnetic data or filtered magnetic data corresponding to noise or other measurement inaccuracies are below the threshold value, but others are above it.

A further reduction of the number of check sites can be achieved if the security thread is only narrow and it is to be expected that only a small number of sites having magnetic data that are not caused by the security thread will occur in a direction transverse to the security thread. It is then preferred in the method that for parallel strips which extend transversely to a predetermined expected direction of the security thread, respectively one check site is determined in the strip for which the magnetic data or filtered magnetic data for sites in the strip fulfill a predetermined strip criterion. For example, as the strip criterion, the criterion can be employed that the magnetic data or filtered magnetic data for the check site are the maximum of the magnetic data or filtered magnetic data for all sites in the strip.

In the method according to the invention use is made of the circumstance that security threads typically extend in straight manner, i.e. along a section of a straight line. However, it is not to be expected that all check sites lie exactly on a straight line.

The location and the extension of a straight line in a plane, in the example the transport plane in which the value document is transported in the region of the magnetic sensor, or the value document plane, can be determined by two straight line parameters. The parameter space for straight lines is therefore two-dimensional, but different parameterizations are possible. In the method, therefore, a set of cells is supplied which represent a division of at least one predetermined part of a parameter space for straight line parameters into cells.

In principle, the entire parameter space can be employed, but for reasons of efficiency only a part of the parameter space needs to be employed. Preferably, the part can be determined in dependence on a predetermined expected direction of the security thread and/or an expected position of the security thread. For example, straight lines that extend perpendicularly to an expected direction of the security thread will not affect the result.

Thus, preferably, in the method, the cells can be selected such that straight lines given by straight line parameters within the respective cell include an angle with the predetermined expected direction of the security thread, which angle lies within a predetermined angular interval, preferably between 0° and 45°.

Further, the security thread should lie within the subregion where the check sites lie. In the method, it is therefore preferred that the cells are selected such that straight lines given by straight line parameters within the respective cell intersect edges of the subregion that extend at least approximately orthogonally to the predetermined expected direction of the security thread. As a result, both the inclination and/or direction of the straight line and the position of the straight line are limited to a sensible region.

The cells can in principle be selected as desired, but are preferably selected to be of equal size.

In the method, in each case those cells of the set of cells are ascertained within which there are straight line parameters of a straight line that extends through the respective check site. For example, the second straight line parameter can be computed from the check site and a first one of the straight line parameters for a cell, with said second straight line parameter then specifying the cell together with the first parameter.

To each of the cells a line sum is allocated which is initially set to the same value for all cells. When it is now established that the straight line parameters of a straight line extending through the check site are within a cell, the line sum is incremented, i.e. increased by a defined increment value.

There are various options for choosing the increment value. Thus, in a preferred embodiment of the method, the increment value can be selected independently of the check site and of the, optionally filtered, magnetic data there. This procedure is particularly simple and can also be applied in particular to security threads in which the magnetic properties are not constant.

In a different embodiment of the method, to each of the check sites a processing value can be allocated that is dependent on the magnetic data or the filtered magnetic data, and the increment value for the respective check site can be dependent on the allocated processing value. Depending on the type of the security thread, this can offer the advantage that check sites with fewer and therefore possibly less reliable magnetic data will not be weighted as heavily.

After the cells have been specified for the check sites whose parameters describe straight lines through the respective check sites and whose cell sums have been incremented accordingly, the cell with the highest cell sum is searched or ascertained. The straight line parameters corresponding to this cell then state the direction and position of the security thread. As a location of the security thread, a straight line given by the straight line parameters allocated to the cell can then be ascertained. Said straight line can be given by the parameters of the cell or other parameters likewise determining the straight line. As other parameters of a cell any desired reference points of the cell can be employed, for example the geometric center of the cell. At least one signal can then be emitted representing the straight line and/or the parameters. It is also possible that the straight line and/or the parameters are stored and/or employed in a further method step.

According to a preferred development, a criterion for the presence of a security thread which depends on the highest line sum can be checked, for which purpose preferably the highest cell sum is compared with a predetermined threshold value, and particularly preferably, in dependence on the result of the comparison, an indication of the presence of a security thread or an indication of the absence of a security thread can be produced and/or stored and/or a signal can be emitted that is indicative of the presence of a security thread or indicative of the absence of a security thread. Such an indication can be employed to assess the presence of authenticity or a suspicion of forgery or forgery.

A further object of the invention is an apparatus for detecting a security thread in a value document, comprising a magnetic sensor for supplying the magnetic data and an evaluation device according to the invention, wherein preferably the magnetic sensor is connected to the interface of the evaluation device for transmitting magnetic data.

The apparatus can preferably further comprise a transport device for transporting the value document along a transport path, wherein the magnetic sensor is arranged on the transport path.

Depending on the type of transport of the value document, the transport direction can be related to the expected direction of the security thread. When the security thread in the value document extends transversely to the longitudinal direction thereof (edge with the greatest length), the expected direction of the security thread lies parallel to the transport direction when the value document is transported in transverse transport, i.e. with its longitudinal direction transverse to the transport direction. When the value document is transported in longitudinal transport, i.e. with its longitudinal direction at least approximately parallel to the transport direction, the expected direction of the security thread is transverse to the transport direction.

The invention can be used particularly well in an apparatus for processing value documents. Therefore the object of the invention is also an apparatus for processing value documents with a feeding device for feeding value documents to be processed, an output device for outputting or receiving the processed value documents, a transport device for transporting the value documents from the feeding device along a transport path to the output device and with at least one apparatus according to the invention arranged in the region of a section of the transport path for detecting a security thread in a value document being transported along the transport path. In particular, the magnetic sensor can be arranged on the transport path.

BRIEF DESCRIPTION OF THE DRAWINGS

The invention will hereinafter be explained further by way of example with reference to the drawings. The figures are described as follows.

DETAILED DESCRIPTION OF VARIOUS EMBODIMENTS

Figure 1:
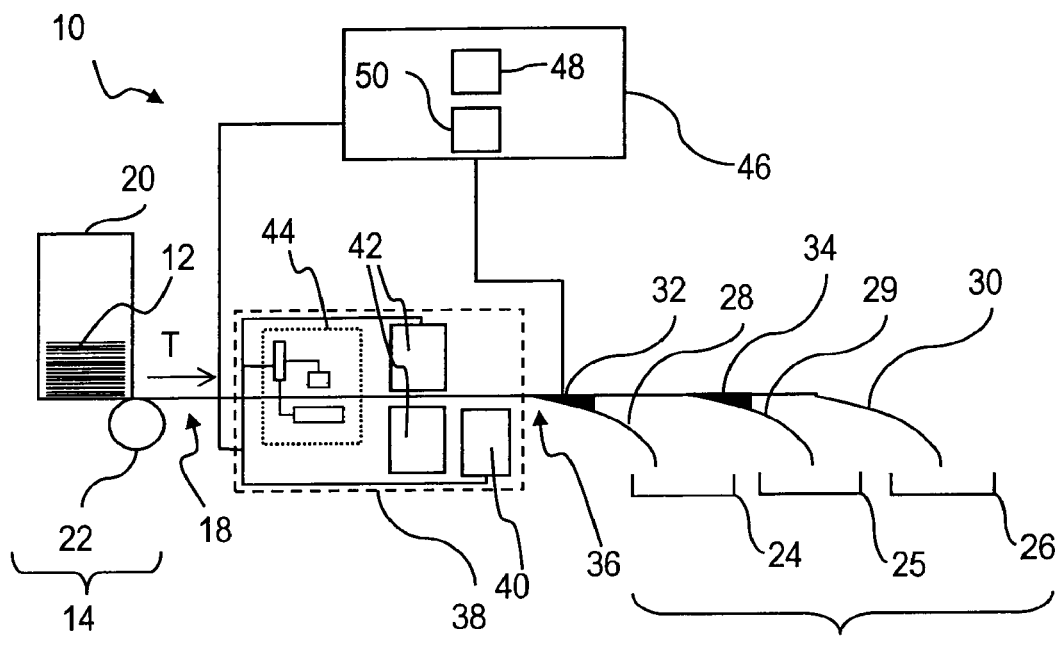
FIG. 1 a schematic representation of a value document processing apparatus, in the example of a banknote sorting apparatus, FIG. 2 a roughly schematic representation of a magnetic sensor of the value document processing apparatus in FIG. 1, FIG. 3 a schematic representation of a value document with a security thread and a field of sites on the value document for which magnetic data are captured, FIG. 4 a roughly schematic flowchart of an example of a method for detecting a security thread in a value document, FIG. 5 a filter employed in step S14, FIG. 6 a schematic representation of a part of a parameter space for straight line parameters, and FIG. 7 a roughly schematic flowchart of a further method for detecting a security thread in a value document.

A value document processing apparatus 10 in FIG. 1, in the example an apparatus for processing value documents 12 in the form of banknotes, is configured to sort value documents 12 in dependence on the state ascertained by the value document processing apparatus 10 and the authenticity of processed value documents checked by means of the value document processing apparatus 10.

It has a feeding device 14 for feeding value documents 12, an output device 16 for dispensing or receiving processed, i.e. sorted value documents, and a transport device 18 for transporting singled value documents from the feeding device 14 to the output device 16.

In the example, the feeding device 14 comprises an input pocket 20 for a value document stack and a singler 22 for singling value documents 12 from the value document stack in the input pocket 20 and supplying or feeding to the transport device 18.

In the example, the output device 16 comprises three output sections 24, 25 and 26 into which processed value documents can be sorted in dependence on the result of the processing, in the example checking. In the example, each of the sections comprises a stack pocket and a stacking wheel (not shown) by means of which fed value documents can be deposited in the stack pocket.

The transport device 18 has at least two, in the example three, branches 28, 29 and 30 at whose ends one of the output sections 24 or 25 or 26 is respectively arranged, and, at the branching points, gates 32 and 34 controllable by actuating signals, by means of which gates value documents can be fed to the branches 28 to 30 and thus to the output sections 24 to 26 in dependence on actuating signals.

On a transport path 36, defined by the transport device 18, between the feeding device 14, in the example more precisely the singler 22, and the first gate 32 after the singler 22 in the transport direction T, there is arranged a sensor device 38 which measures physical properties of the value documents when value documents are being transported past, and forms sensor signals reproducing the measurement results which represent sensor data. In this example, the sensor device 38 has three sensors, namely an optical remission sensor 40 which captures a remission color image of the value document, an optical transmission sensor 42 which captures a transmission image of the value document, and a magnetic sensor 44 which captures or measures in spatially resolved manner at least one magnetic property of the value document and forms corresponding sensor signals or sensor data which represent the magnetic property captured or measured for a respective site.

A control and evaluation device 46 is connected via signal lines to the sensor device 38 and the transport device 18, in particular the gates 32 and 34. In connection with the sensor device 38, it classifies a value document in dependence on the signals or sensor data of the sensor device 38 for the value document into one of predetermined sorting classes. These sorting classes can be predetermined, for example, in dependence on a state value ascertained by means of the sensor data and likewise in dependence on an authenticity value ascertained by means of the sensor data. For example, the values "fit for circulation" or "unfit for circulation" can be employed as state values; the values "forged", "suspected of forgery" or "authentic" can be employed as authenticity values. In dependence on the ascertained sorting class, it drives by emitting actuating signals the transport device 18, here more precisely the gates 32 or 34, such that the value document is output, in accordance with its sorting class ascertained upon the classification, into an output section of the output device 16, said section being allocated to the class. The allocation to one of the predetermined sorting classes or the classification takes place here in dependence on criteria predetermined for the assessment of the state and the assessment of the authenticity, which depend on at least a part of the sensor data.

The control and evaluation device 46 has for this purpose in particular, besides corresponding interfaces for the sensor device 38 or its sensors, a processor 48 and a memory 50 which is connected to the processor 48 and in which there is stored at least one computer program with program code upon whose execution the processor 48 controls the apparatus and evaluates the sensor signals of the sensor device 38, in particular for ascertaining a sorting class of a processed value document. Further, program code is stored upon whose execution the processor 48 controls the apparatus and drives the transport device 18 in accordance with the evaluation.

The control and evaluation device 46 ascertains from the sensor signals of the sensors of the sensor device 38 upon a sensor signal evaluation at least one value document property which is relevant for the checking of the banknotes with respect to their authenticity and/or state. Preferably several such value document properties are ascertained. In this example, as optical value document properties, a transmission image and a remission image and magnetic data which describe at least one magnetic property of the value document in dependence on the site on the value document are ascertained, and, on the basis thereof, the presence, the location and properties of a security thread are ascertained.

In dependence on the value document properties, the control and evaluation device 46 respectively ascertains, while employing the sensor data of the various sensors in partial evaluations, whether or not the ascertained value document properties represent an indication of the state or the authenticity of the value document. Following this, corresponding data can be stored in the control and evaluation device 46, for example the memory 50, for later employment. In dependence on the partial evaluations, the control and evaluation device 46 then ascertains a sorting class as the overall result for the check according to a predetermined overall criterion, and forms the sorting or actuating signal for the transport device 18 in dependence on the ascertained sorting class.

For processing value documents 12, value documents 12 inserted into the input pocket 20 as a stack or singly are singled by the singler 22 and fed in singled form to the transport device 18, which transports the singled value documents 12 past the sensor device 38. The latter captures the properties of the value documents 12, wherein sensor signals are formed which reproduce the properties of the respective value document. The control and evaluation device 46 captures the sensor signals or sensor data, ascertains in dependence thereon a sorting class, in the example a combination of an authenticity class and a state class, of the respective value document, and so drives the gates in dependence on the result that the value documents are transported in accordance with the ascertained sorting class into an output section allocated to the respective sorting class.

Among other things, an apparatus 52 for detecting a security thread in a value document, in this example the magnetic sensor 44, a corresponding section of the control and evaluation device 46, in particular corresponding instructions of the computer program therein, serves to ascertain a sorting class in dependence on the magnetic properties of the value document.

Figure 2:
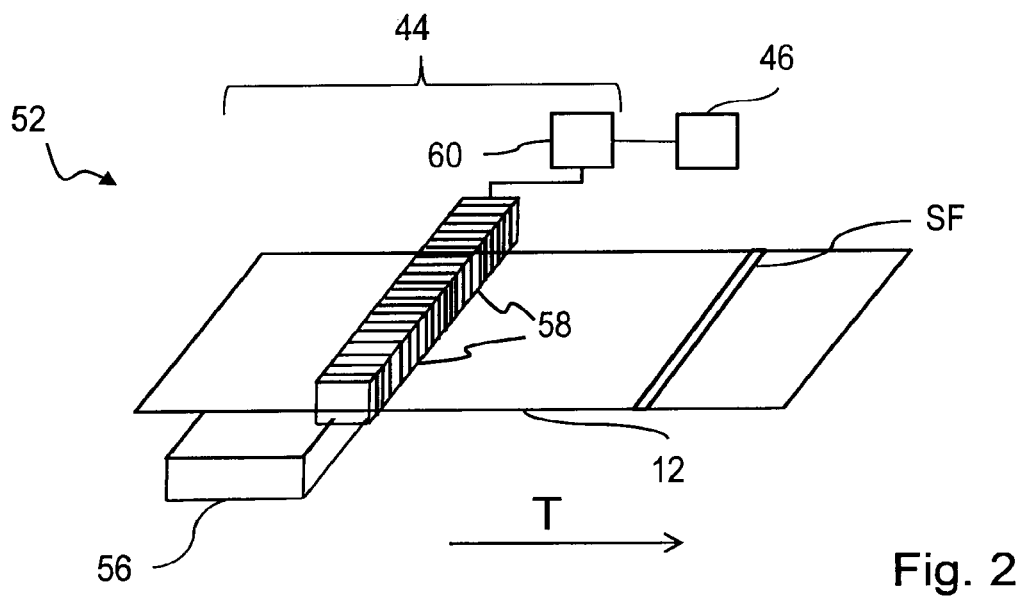

The magnetic sensor 44 is shown roughly schematically in FIG. 2. It comprises a device 56 for producing a magnetic field and magnetic-field sensitive sensor elements 58, which are configured identically and arranged along a line transversely to the transport direction T and are configured to capture a magnetic field and form corresponding element signals. A signal processing unit 60, which is connected to the control and evaluation device 44, serves to process the element signals of the sensor elements 58 and form the sensor signals or sensor data of the magnetic sensor 44. The device 56 for producing a magnetic field can comprise at least one permanent magnet and/or one electromagnet. In the example, the sensor elements 58 are magneto-resistive sensor elements, in other embodiments these could also comprise inductively operating sensor elements and/or Hall sensors and/or GMR sensors.

The magnetic sensor 44 captures magnetic data for sites on the value document at predetermined time intervals, said sites lying in a line transversely to the transport direction in accordance with the arrangement of the sensor elements 58, and transmits these data to the control and evaluation device 46. The magnetic data for a site are transmitted and stored such that magnetic data and sites are allocated to each other. In the example, the magnetic data are stored in dependence on a coordinate along a direction parallel to the transport direction and a coordinate perpendicular to the direction parallel to the transport direction. While the sites and thus their coordinates are given transversely to the transport direction by the magnetic sensor elements of the magnetic sensor, the coordinates in the transport direction result from of the transport speed, which is predetermined by the transport device, and the capture times or the length of the time intervals. For the same coordinates transverse to the transport direction, there result, at successive points in time and thus in sites arranged in strips along the transport direction and correspondingly spaced, magnetic data allocated thereto. The control and evaluation device 46 stores the magnetic data received for the value document in dependence on the site. After the value document has passed the magnetic sensor 44, therefore, at constant transport speed, magnetic data are thus present for sites on a rectangular grid, whose grid spacing, in the transport direction, depends on the transport speed and the time intervals and, perpendicular to the transport device, on the spacing of the magnetically sensitive elements.

Figure 3:
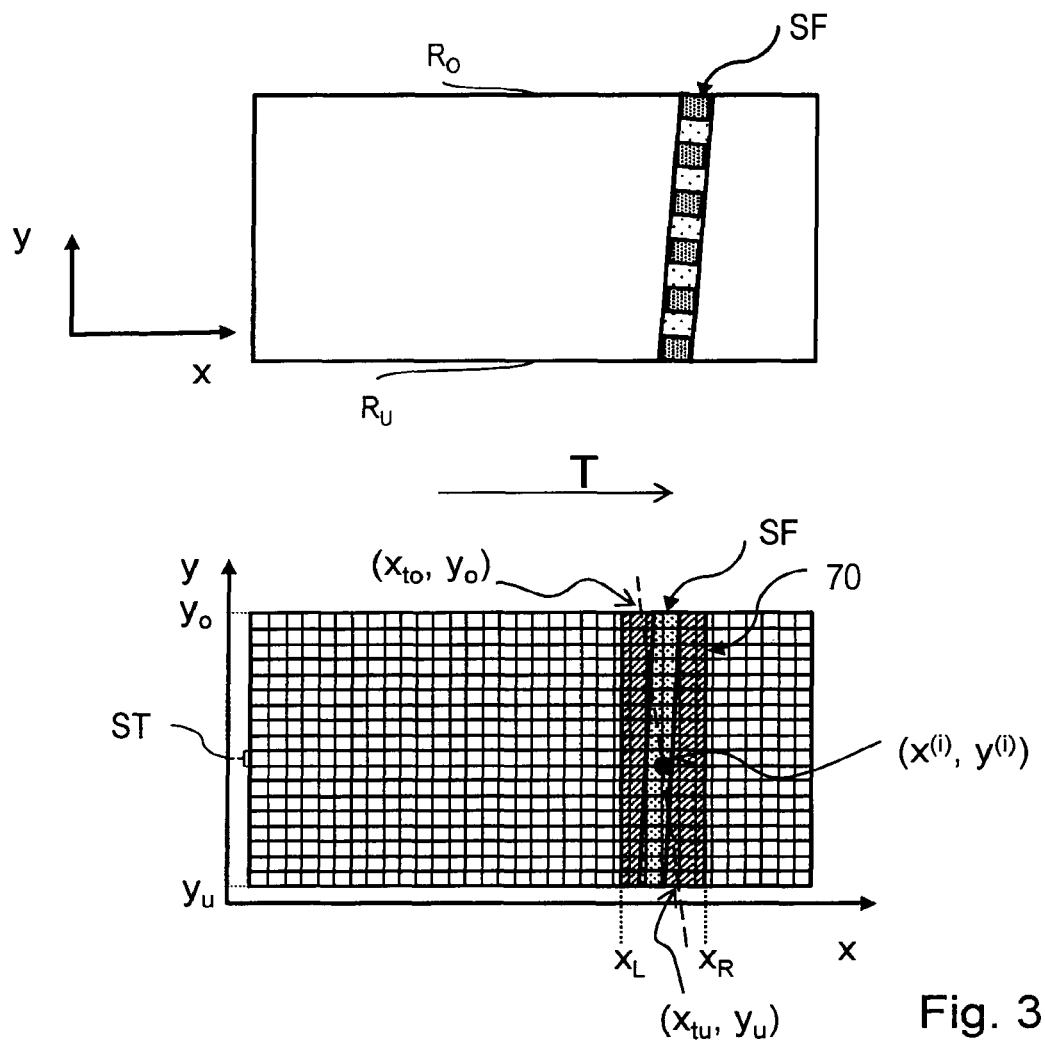

FIG. 3 shows at the top a value document with a security thread SF and below the corresponding field of sites where magnetic data have been captured. The captured magnetic data are allocated to sites $(x^{(i)}, y^{(i)})$ on the value document, which in the example lie on a rectangular grid. x designates a coordinate in the longitudinal direction and thus in this example in the transport direction T of the value document, y designates a coordinate perpendicular thereto. With the index i (i=1, ..., N, N number of sites) the sites are differentiated or counted. For the sake of clarity, only a few sites are shown in FIG. 3; in fact the number can be substantially greater.

Since in this example it is assumed that the value documents each have a security thread SF which is arranged in an expected direction parallel or at least approximately parallel to the short side of the value document or transversely to the longitudinal direction or longer side of the value document (cf. FIGS. 2 and 3), and that the value documents are transported with their longitudinal side at least approximately parallel to the transport direction T, the expected direction of the security thread extends in the direction of the y axis and transversely to the transport direction T.

In the example in FIG. 3, to illustrate the general case, the security thread is shown inclined with respect to the direction to be actually expected relative to the longitudinal edge or transport direction, which can be caused, for example, by irregularities in transport. Ideally, it would extend in the expected or expectable direction perpendicular to the transport direction.

Figure 4:
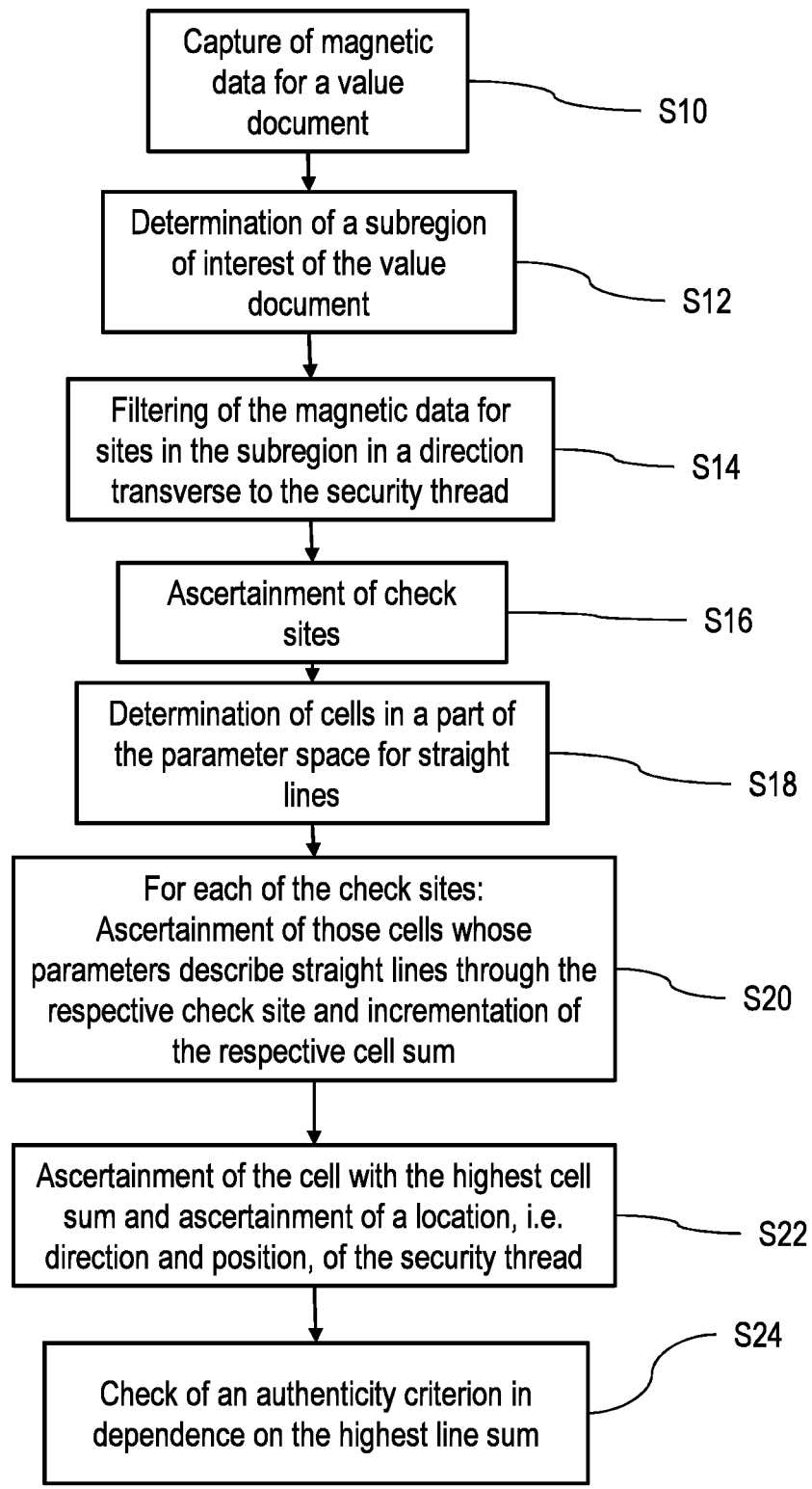

The control and evaluation device 46 comprises a data processing device. In the memory 50 of the control and evaluation device 46 or the apparatus 52 a computer program with program code is stored upon whose execution by the processor 48 of the control and evaluation device 46 the following method for detecting the security thread in the value document is carried out. The method is illustrated roughly schematically in FIG. 4.

In step S10, the magnetic sensor 44 captures magnetic data at predetermined time intervals while a value document is transported past.

These magnetic data are stored in the memory 50 in a manner allocated to the sites and thus supplied for the method. In this example, they can be stored in matrix form, wherein x and y coordinates are replaced by corresponding line and column indices.

In steps S12 to S16, check sites are determined, which are employed in the following steps, i.e. from step S18.

In the optional step S12, employing the magnetic data, a subregion of interest of the value document is determined, in which the security thread is to be expected. For this purpose, in the present example, average values are formed over magnetic data at sites in columns extending respectively in the y direction. The sites of the columns each have the same x coordinate, but different y coordinates. These average values are filtered with a filter which smoothes and at the same time ascertains gradients, for which purpose a Haar wavelet filter, for example, can be employed. The x coordinate of the maximal filter response then gives an indication of the approximate location of the security thread in the x direction. As a subregion, a rectangle can then be ascertained which is limited in the y direction by the opposing edges $R_U$ and $R_O$ of the value document and in the x direction by two straight lines in the y direction. In the example, the x coordinates of the straight lines in the y direction limit an interval of a predetermined length, in whose middle the ascertained x coordinate of the maximum filter response lies. The length can be determined in a predetermined manner in dependence on a maximal extension of value documents to be processed in the y direction and a maximal inclination of the security thread to be expected in the captured data with respect to the y axis. Such a subregion 70 is represented in FIG. 3 as a hatched rectangle in which the security thread SF lies. It extends between the two edges $R_U$ and $R_O$ of the value document extending parallel to the transport direction T, with y coordinates $y_u$ and $y_o$, and is limited in the transport direction by two straight lines perpendicular to the transport direction which intersect the x axis at the coordinates $x_L$ and $x_R$.

In the following, only sites in this subregion will be considered or employed further.

In step S14, which is likewise optional, in order to determine the check sites, the magnetic data for sites in the subregion in a direction transverse to the security thread are filtered, thus forming filtered magnetic data. This is done to highlight contributions that come from the security thread. The filter employed is a filter which responds to gradients of the magnetic data in a direction transverse to the expected direction of the security thread, thus in this case in the x direction. In this example, it is intended to additionally have a smoothing effect.

Figure 5:
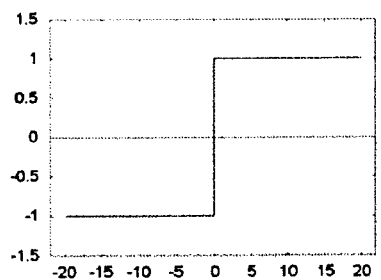

In the present example, a Haar wavelet is employed for this purpose, which is schematically illustrated in FIG. 5 and whose rectangles have a width in dependence on the spatial resolution of the magnetic data, for example 20 pixels in the x direction. In the representation, a representation of the magnetic data in matrix form is assumed.

In the following step S16, check sites are determined in the subregion employing the filtered magnetic data. For this purpose, it is assumed in the example that the security thread SF does not extend parallel to the transport direction T or the x axis, but approximately in an expected direction perpendicular to the transport direction T. Parallel strips ST, which extend transversely to a predetermined expected direction of the security thread SF or in the transport direction, are considered. In the example, the strips extend parallel to the x axis, wherein their width corresponds to the spacing of the sites in the y direction. The sites of a strip then lie on a straight line parallel to the x axis. For a respective strip, sites in the strip are searched which fulfill a predetermined strip criterion for the filtered magnetic data. In the example said criterion is that the maximum of the filtered magnetic data of sites of the strip lies at the site. Thus, for a strip, that site is searched at which the maximum of the filtered magnetic data of sites of the strip lies. If the maximum exceeds a predetermined minimum value, which is above the threshold for noise in the magnetic data, the site is determined as check site.

In step S18, cells are determined in at least a part of the parameter space for straight lines in the x-y plane, wherein to each of the cells there is allocated a cell sum which is initially set to an equal initial value for all cells, for example 0.

Figure 6:
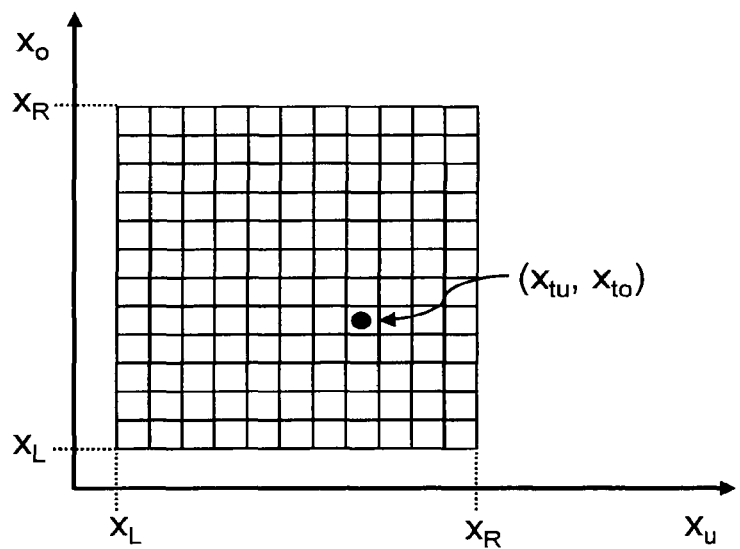

The parameter space for lines in the x-y plane is two-dimensional. In the example, it was assumed that the security thread extends transversely to the transport direction and thus the x axis, and that the subregion is dimensioned such that the security thread extends within the subregion. For example, the x coordinates of intersection points of a straight line with the edges of the value document or the corresponding sides of the subregion can be employed as straight line parameters, since the edges or their location can be assumed to be given for this method step. In the following, the coordinates of intersection points with the one, in the example the lower edge $R_U$, are deemed to be given by $(x, y_u)$, and the coordinates of intersection points with the other, upper edge $R_O$ lying opposite the first edge, are deemed to be given by $(x, y_o)$, wherein x in each case designates the coordinate in the x direction and $y_u$ and $y_o$ designate the y coordinate of the lower end of the upper edge $R_U$ and $R_O$. Since $y_u$ and $y_o$ are determined by the extension of the edges, the part of the parameter space is therefore given by the product of the possible x coordinates in the subregion for the intersection points with the one edge and from the possible x coordinates in the subregion for the intersection points with the second opposite edge; these are respectively the intervals with $x_L \leq x \leq x_R$. This selection also determines the size of the part of the parameter space. The resulting part of the parameter space is illustrated in FIG. 6, in which $x_u$ designates the parameter that corresponds to the x coordinate of a point of a straight line on the lower edge and $x_o$ designates the parameter that corresponds to the x coordinate of a point of a straight line on the upper edge. The part of the parameter space is subdivided into cells of equal size, wherein the size is predetermined in dependence on the desired accuracy and the still acceptable computing time. In the figure, the number of cells is only 11*11=121 for the sake of clarity.

In step S20, those cells whose parameters describe straight lines through the respective check site are then ascertained for each of the check sites; their cell sum is incremented in each case. For this purpose, it is checked which straight lines extend through the respective check site whose straight line parameters lie in one of the cells. In the example, due to the arrangement of the cells, for example, for each parameter interval on the $x_u$ axis, a straight line can be specified whose first parameter lies in the middle of the parameter interval and which leads through the check site. This is exemplified in FIG. 3 by the dashed straight line through the point $(x_{tu}, y_u)$ and the site or point $(x^{(i)}, y^{(i)})$. It can then be specified at which point $(x_{to}, y_o)$ the straight line intersects the upper edge. Then that cell is searched within which the resulting parameter point $(x_{tu}, x_{to})$ lies (cf. FIG. 6). The cell sum of the corresponding cell given by $(x_{tu}, x_{to})$ is then increased by an increment value. In this example, the increment value employed is a processing value dependent on the magnetic data, which is the unfiltered value of the magnetic data for the check site.

In step S22, the control and evaluation device 46 or its processor searches among the cells for the one which has the highest cell sum. As the location of the security thread then a straight line is ascertained, which is given by straight line parameters allocated to the cell. Data specifying the location of the security thread will be ascertained for this purpose from the parameters corresponding to the cell. In the example, said location could be given by the points on the edges with the x coordinates corresponding to the parameters given by the cell and corresponding y coordinates $y_u$ and $y_o$. Then corresponding parameters or data are stored. These can then be employed by a method for checking the security thread. Further, a signal can be produced which describes the parameters or data.

In an optional step S24 it is possible to check whether the value of the cell sum fulfills an authenticity criterion. In the example, the criterion employed is whether the cell sum exceeds a threshold value which is characteristic of security threads of authentic value documents, preferably of the predetermined value document type. The value document type can have previously been specified from data of at least one of the optical sensors while employing corresponding reference data. If said threshold value is exceeded, a signal is emitted indicating that a security thread is present. This signal can be employed together with other evaluation results to ascertain an authenticity of the value document or a corresponding sorting class and to emit a corresponding actuating signal. If the threshold is undershot, a signal is emitted indicating that a security thread is not present. This signal can be employed as an indication of the presence of a suspicion of forgery for the value document; optionally in connection with other evaluation results, it can be employed to ascertain a corresponding sorting class and to emit a corresponding actuating signal.

In other embodiment examples, it can additionally be checked whether the ascertained location of the security thread lies in a range permissible for the value document type. If this is the case, a corresponding authenticity signal is emitted which represents an indication of the authenticity of the document and/or a corresponding signal is emitted. These can then be employed to ascertain the authenticity of the value document together with other evaluation results of the other sensors.

For example in the case of coded threads, this can be followed in a further step by a check of the security thread itself, in the example a check of the coding of the security thread, in which the ascertained straight line or the ascertained parameters are employed. Such a check is described, for example, in DE 10 2013 205 891 A1, whose contents describing the method are hereby incorporated by reference into the description. Depending on the result of the check, a further authenticity signal can be emitted which indicates whether there is an indication of forgery or not.

Figure 7:
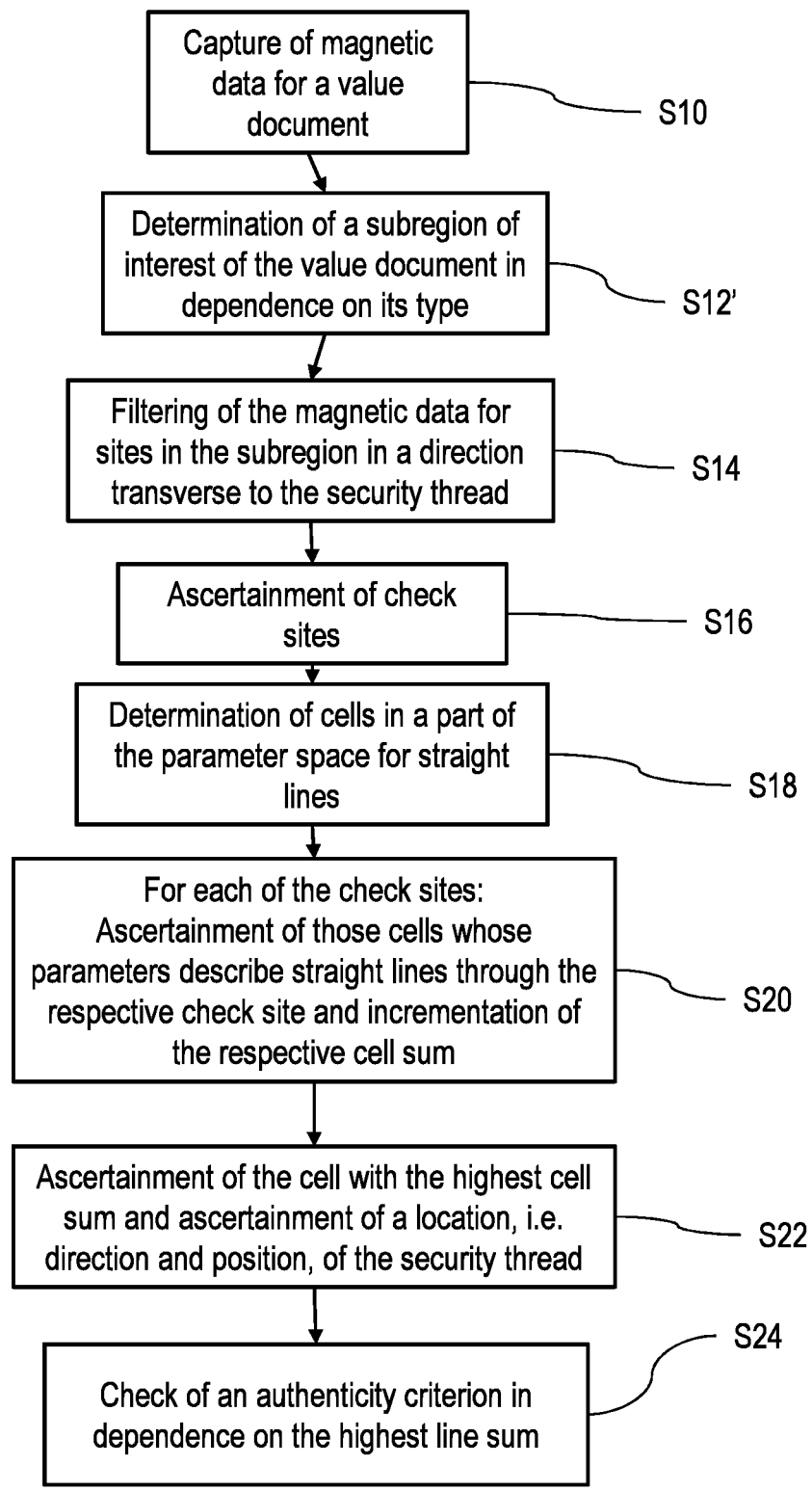

A further embodiment example in FIG. 7 differs from the first embodiment example in that the step S12 is replaced by a step S12'. In this step S12', for determining a subregion of interest of the value document, the substep first takes place of ascertaining the value document type, in the example the currency, the denomination and the issue of the value document, and the location of the value document in the transport path, for example in dependence on a digital image of the value document, which was captured by means of at least one optical sensor, in the example by the optical remission sensor 40 and/or the transmission sensor 42. Further, corresponding reference data stored in the control and evaluation device 46 are employed, which describe a subregion of interest of the value document for a given value document type and a given location. These data, which are specified in dependence on the value document type ascertained and the location ascertained, determine the subregion of the value document to be employed in the following.

The further steps of the method are unchanged with respect to the first embodiment example.

Further embodiment examples differ from the described embodiment examples in that, instead of the Haar wavelet, a first derivative of the Gaussian bell curve or the magnetic signal itself is employed as the filter in step S14.

Other embodiment examples differ from the described embodiment examples in that step S16 does not employ the filtered magnetic data for ascertaining check sites, but for each of the strips that site is selected as the check site where the magnetic data of the respective strip are maximal.

Further embodiment examples differ from the described embodiment examples in that the steps S18 to S22 are changed such that different straight line parameters, for example based on polar coordinates, are employed. In the case of employing polar coordinates, the location of a straight line relative to the respective check site can be given by an angle to the transport direction or an edge of the value document and the distance of the straight line from the point.

Further embodiment examples differ from the described embodiment examples in that a constant value which is not dependent on the magnetic data is employed as the increment value in step S20.

Further embodiment examples differ from the described embodiment examples in that the control and evaluation apparatus 46 comprises separate units which each have a processor and a memory in which corresponding program code is stored, and one of which has an interface for the sensor device and is configured to evaluate the sensor data of at least the magnetic sensor and to output a sorting signal, and a different one is configured to control the apparatus in dependence on the sorting signal.

The invention claimed is:

1. A method for detecting a security thread in a value document, in which
   magnetic data for sites on the value document are employed which data represent a magnetic property of the value document at the site,
   check sites on the value document are determined employing the sites, and
   from the check sites a straight line is determined, along which or on which at least some of the check sites lie and which represents a location of the security thread.

2. The method according to claim 1, wherein
   by means of a magnetic sensor magnetic data are captured for sites on the value document and these magnetic data are employed as magnetic data.

3. The method according to claim 1, wherein check sites are determined which lie in a subregion of the value document.

4. The method according to claim 3, wherein a value document type of the value document is specified, and the subregion is predetermined in dependence on the value document type of the value document and preferably its location.

5. The method according to claim 3, wherein the subregion is specified from the magnetic data.

6. The method according to claim 1, wherein, for determining the check sites, the magnetic data are filtered, thus forming filtered magnetic data, and the filtered magnetic data are employed to determine the check sites, wherein preferably a filter is employed for filtering that has a smoothing effect and/or responds to gradients of the magnetic data.

7. The method according to claim 1, wherein, when determining the check sites for parallel strips that extend transversely to a predetermined expected direction of the security thread, respectively such a site in the strip is determined as the check site for which the magnetic data or filtered magnetic data for sites in the strip fulfill a predetermined strip criterion.

8. An evaluation device for detecting a security thread in a value document, having an interface for capturing signals from which the magnetic data can be ascertained, or for capturing the magnetic data, and being adapted to carry out a method according to claim 1.

9. An apparatus for detecting a security thread in a value document, comprising
   a magnetic sensor for supplying the magnetic data, and
   an evaluation device according to claim 8, wherein preferably the magnetic sensor is connected to the interface of the evaluation device for transmitting magnetic data.

10. The apparatus according to claim 8, further comprising a transport device for transporting the value document along a transport path, wherein the magnetic sensor is arranged on the transport path.

11. An apparatus for processing value documents, with a feeding device for feeding value documents to be processed, an output device for outputting or receiving the processed value documents, a transport device for transporting the value documents from the feeding device along a transport path to the output device and with at least one apparatus arranged in the region of a section of a transport path for detecting a security thread in a value document being transported along the transport path, according to claim 10.

12. A method for detecting a security thread in a value document, in which
- magnetic data for sites on the value document are employed which data represent a magnetic property of the value document at the site,
- check sites on the value document are determined employing the sites,
- a set of cells is supplied that represent a division of at least one predetermined part of a parameter space for straight line parameters into cells,
- for the check sites respectively such cells of the set are ascertained within which respectively straight line parameters lie, said straight line parameters being straight line parameters of a straight line extending through the respective check site, and a cell sum for the respective cell is increased by an increment value, and
- the cell with the highest cell sum is searched and, as the location of the security thread, a straight line is ascertained that is given by straight line parameters allocated to the cell.

13. The method according to claim 12, wherein the part of the parameter space is determined in dependence on a predetermined expected direction of the security thread and/or an expected position of the security thread.

14. The method according to claim 12, wherein the cells are selected such that straight lines that are given by straight line parameters within the respective cell, enclose an angle with the predetermined expected direction of the security thread which angle is at a predetermined angular interval, preferably between 0° and 45°.

15. The method according to claim 12, wherein the cells are selected such that straight lines that are given by straight line parameters within the respective cell, intersect edges of the subregion that extend at least approximately orthogonally to the predetermined expected direction of the security thread.

16. The method according to claim 12, wherein the increment value is independent of the check site.

17. The method according to claim 12, wherein to each of the check sites there is allocated a processing value that is dependent on the magnetic data or the filtered magnetic data, and the increment value for the respective check site is dependent on the allocated processing value.

18. The method according to claim 12, wherein a criterion for the presence of a security thread that depends on the highest line sum is checked, for which purpose preferably the highest cell sum is compared with a predetermined threshold value, and particularly preferably, in dependence on the result of the comparison, an indication of the presence of a security thread or an indication of the absence of a security thread is produced and/or stored and/or a signal is emitted that is indicative of the presence of a security thread or indicative of the absence of a security thread.

19. A computer program for execution by means of a data processing device with a processor containing program code upon whose execution the processor executes a method according to claim 12.

20. A computer-readable data carrier on which a computer program according to claim 19 is stored.

* * * * *